US005895445A

United States Patent [19]

Hong et al.

[11] Patent Number: 5,895,445

[45] Date of Patent: Apr. 20, 1999

[54] METHOD FOR MANAGING FACILITIES AND WORKERS WITHIN A CLOSED RANGE

[75] Inventors: Mun-Hee Hong; Seok-Ho Seo; Bum-Suk Seo, all of Incheon, Rep. of Korea

[73] Assignee: Daewoo Telecom Ltd., Incheon, Rep. of Korea

[21] Appl. No.: 08/837,762

[22] Filed: Apr. 22, 1997

[51] Int. Cl.$^6$ .......................... G08B 25/14; G06F 113/30

[52] U.S. Cl. .................... 702/182; 364/188; 340/825.06; 340/825.07

[58] Field of Search ..................................... 364/550, 188, 364/551.01, 825.07; 340/825.06, 825.08, 508, 522, 540, 825.52; 702/182

[56] References Cited

U.S. PATENT DOCUMENTS 5,416,725 5/1995 Pacheco et al. ........................ 364/514

FOREIGN PATENT DOCUMENTS 9320544 10/1993 WIPO .

*Primary Examiner*—John Barlow
*Assistant Examiner*—Damini Shah
*Attorney, Agent, or Firm*—Pennie & Edmonds LLP

[57] ABSTRACT

A method efficiently manages equipment and personnel within a closed passage such as a tunnel and the like. At a first step, sensing values measured by sensors through a corresponding AUX device in each set are monitored to generate a set of monitored sensing values. At a next step, each monitored sensing value in the set is compared with a corresponding predetermined threshold value to provide information corresponding to the comparison result. At a final step, it is decided whether or not a trouble is detected within the passage based on the comparison result information to produce information representing the decision result and, in response to the decision result information, automatically sending predetermined emergency guide information to each of predetermined agencies and controlling the operation of each of components within the passage.

11 Claims, 11 Drawing Sheets

METHOD FOR MANAGING FACILITIES AND WORKERS WITHIN A CLOSED RANGE

FIELD OF THE INVENTION

The present invention relates to a cable tunnel management method; and, more particularly, to a method capable of effectively managing facilities and workers within a closed passage such as a tunnel by employing an improved cable tunnel management technique.

BACKGROUND OF THE INVENTION

It is well known that a cable tunnel management system (CATMS), usually located above the ground level, manages facilities and workers within a closed passage such as a tunnel so as to protect them from disaster in case of a trouble such as a fire, harmful gas leakage, water intrusion or the like within the passage. In general, such a CATMS includes a central concentrated center (CCC) and a remote station (RS) module having a plurality of RS units which are incorporated above ground. The CATMS further includes an auxiliary (AUX) module having a number of sets of AUX devices and a number of sets of sensors which are installed within the closed passage, each AUX device of each of their sets being connected with a corresponding RS unit and also coupled with a corresponding set of sensors.

Specifically, when a predetermined start instruction is given by the CATMS's operator, the CCC issues a management start signal to each AUX device in said each of their sets through a corresponding RS unit to initiate a management process for facilities and workers in the closed passage. In response to the management start signal, each AUX device starts to receive sensing values measured by a corresponding set of sensors coupled thereto to generate and transfer formatted sensing data to a corresponding RS unit via a cable. The formatted sensing data includes overhead information which has data representing the type thereof, address data of each AUX device and data indicating the sequence of each sensor and sensing values obtained therefrom. The sensors in said each of their sets are capable of sensing a person, water level, fire, gas, temperature/humidity and door within the passage, and operation status of each of components included therein, respectively.

Each RS unit, which is connected between the CCC and each AUX device in a corresponding set of them, serves to add address data of said each RS unit to the formatted sensing data from said each AUX device to provide newly formatted sensing data to the CCC. Using the newly formatted sensing data, the CCC decides whether a trouble is detected within the closed passage, wherein the trouble may indicate a fire, a harmful gas leakage, a water intrusion, or the like within the passage. That is to say, the CCC first extracts the sensing values from the newly formatted sensing data based on the overhead information included therein and compares each of the extracted sensing values with a corresponding predetermined threshold value. Through such a comparison, if it is decided that a trouble is detected within the passage, the CCC displays warning information indicating the trouble on a monitor of a terminal therein and sounds a warning by using an alarm device contained therein so that personnel in the CCC are warned of the trouble or emergency in the passage.

When the CATMS' operator wishes to inform the emergency to all personnel within the passage and to predetermined organizations such as a firehouse, government and public office, and related sections in the CATMS, the CCC sequentially announces emergency guide information to all the workers through the corresponding RS units and AUX devices and to the organizations via corresponding telephone lines, wherein such a sequential announcement may be carried out by following an instruction issued by the CATMS's operator, which is very inconvenient and time consuming process. Further, in order to fix the trouble in the closed passage, the personnel involved usually enter the troubled area in person to take a series of actions needed to mend the trouble, resulting in a prolonged processing time. These whole time consuming processes may cause significant delay in taking steps to mend the trouble, thereby increasing a chance for a serious mishappening.

SUMMARY OF THE INVENTION

It is, therefore, a primary object of the present invention to provide a method, for use in a CATMS, which is capable of effectively protecting facilities and workers within a closed passage from disaster upon an occurrence of a trouble within the passage by using a novel automatic tunnel management technique.

In accordance with the invention, there is provided a method, for use in a cable tunnel management system (CATMS), for managing facilities and workers within a closed passage, wherein the CATMS includes sets of auxiliary (AUX) devices installed within the passage, each of the AUX devices in each set being connected with a plurality of sensors and a multiplicity of components which are incorporated within the passage, which comprises the steps:

(a) monitoring sensing values measured by the sensors through said each AUX device to generate a set of monitored sensing values;

(b) storing a predetermined set of threshold values;

(c) retrieving the predetermined set of threshold values and comparing each of the monitored sensing values in the set with a corresponding retrieved threshold value in the predetermined set, respectively, to provide information corresponding to the comparison result; and (d) deciding whether or not a trouble takes place within the passage based on the comparison result information to produce information corresponding to the decision result and, in response to the decision result information, automatically sending predetermined emergency guide information to each of predetermined offices and controlling the operation of each of the components.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
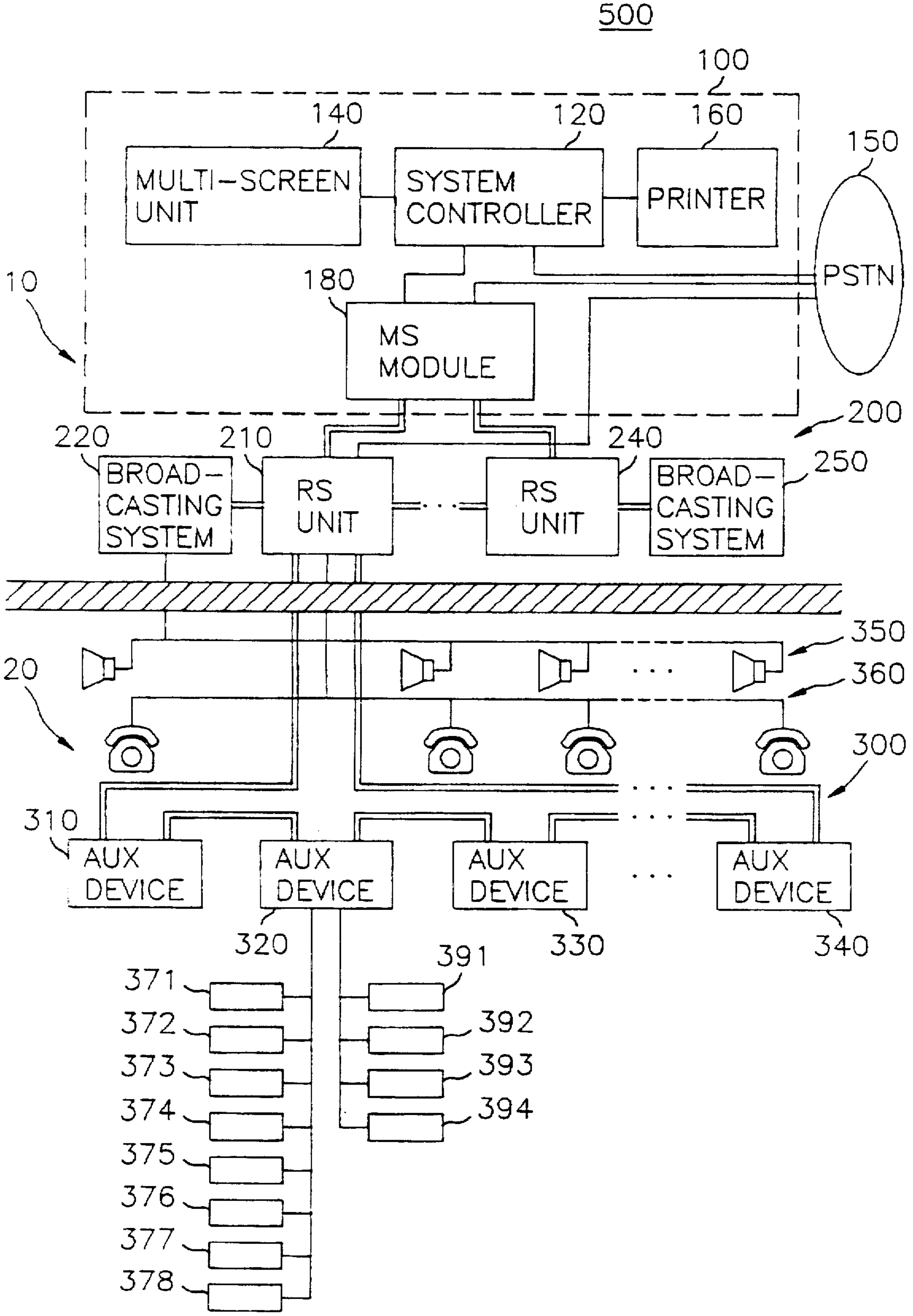
FIG. 1 shows a block diagram of a CATMS in accordance with the present invention.

Referring to FIG. 1, there is depicted a block diagram of a novel CATMS 500 in accordance with the present invention. The inventive CATMS 500 comprises a CCC 100 and an RS module 200 which are usually located above ground 10, and an AUX module 300 which is installed within a closed passage 20 such as a tunnel or the like. The CCC 100 has a system controller 120, a multi-screen unit 140 and a printer 160 and a main station module 180, wherein the controller 120 includes a master station input & output (MSIO) module having an MSIO device and a buffer, a graphic user interface (GUI) unit, a personal computer, a timer, and a storage device such as a hard disk (not shown) and the MS module 180 includes an alarm device with a very small loudspeaker (not shown). The RS module 200 has a plurality of, e.g., 2, RS units 210 and 240, and broadcasting systems 220 and 250 connected to each of them, respectively. The AUX module 300 has a number of sets of AUX devices, e.g., a set of four AUX devices 310 to 340, each of the four AUX devices, e.g., 320, being coupled with eight sensors 371 to 378 and four components, e.g., a fan 391, a cooler 392, a pump 393 and a guidance lamp 394. The sensors 371 to 374, 376 and 378, 375 and 377 are capable of sensing a person, water level, fire, gas, door and temperature/humidity, and operation status of each of the fan 391 and the pump 393, respectively.

For the sake of simplicity, the inventive method will be described with reference to the CCC 100, one RS unit 210 out of many, the broadcasting system 220 coupled to the RS unit 210, one AUX device 320 among the AUX devices in the sets, the sensors 371 to 378 and the components 391 to 394 which are connected to the AUX device 320.

Specifically, when a predetermined start instruction, e.g., CATMS_O, is given by a CATMS's operator, the system controller 120 issues a management start signal MSS to the AUX device 320 through the MS module 180 and the RS unit 210. Conventionally, such an issuance of the management start signal is made by pressing alphanumeric keys, which correspond to the start instruction CATMS_O, on a keypad of the personal computer contained in the controller 120. All the devices in the controller 120 are utilized to properly manage the facilities and the workers within the closed passage, as further described later. The multi-screen unit 140 and the printer 160 are employed to display and print all the information derived at the system controller 120, respectively, through the use of a novel cable tunnel management scheme in accordance with the invention which will be explained in detail later.

In response to the management start signal MSS, the AUX device 320 starts to monitor sensing values from the sensors 371 to 378 to provide a set of monitored sensing values. Using the set of monitored sensing values, the AUX device 320 generates formatted sensing data based on one of conventional data formation methods and transmits same to the RS unit 210 through a dual cable and the AUX device 310 at a first predetermined transfer rate, e.g., 2.4 Kbps. The formatted sensing data includes overhead information which has data representing the type thereof, address data of the AUX device 320, data representing the sequence of each of the sensors 371 and 378 and the sensing values obtained therefrom.

The RS unit 210, which connects the AUX device 320 to the MS module 180, first adds address data thereof to the formatted sensing data sent through the dual cable via the AUX device 310 or via the AUX devices 330 and 340 from the AUX device 320 to provide newly formatted sensing data. And then, the RS unit 210 converts the transfer rate of the newly formatted sensing data into a second predetermined transfer rate, e.g., 9.6 Kbps, to interface same to the MS module 180. The MS module 180 couples the RS unit 210 to the controller 120 to interface the newly formatted sensing data from the RS unit 210 to the controller 120. Further, as mentioned above, the module 180 includes the alarm device to generate a warning alarm when a trouble such as a fire, explosive gas leakage, flooding or the like occurs within the closed passage.

Based on the newly formatted sensing data from the MS module 180, the system controller 120 decides if the trouble as described above is detected within the closed passage. More specifically, the system controller 120 first extracts the sensing values from the newly formatted sensing data based on the overhead information included therein and then compares each of the extracted sensing values with a corresponding predetermined threshold value, respectively. Subsequently, under the control of the controller 120, the computer contained therein displays the information corresponding to the comparison result on the multi-screen unit 140 or a monitor of the computer.

For instance, through the comparison operation, if it is decided that any trouble is detected within the passage, the controller 120 provides an alarm device control signal ADCS and four component control signals CCS1 to CCS4 to the alarm device in the MS module 180 and to the components 391 to 394 through the devices coupled between them, respectively. In response to the alarm device control signal ADCS, the alarm device generates a warning alarm so that the CATMS's operator and the personnel within the CCC 100 can realize the trouble or emergency circumstances detected in the closed passage; and, in response to each of the component control signals CCS1 to CCS4, each of the components 391 to 394 is turned on or off.

As shown in FIG. 1, an audio output module 350 having a multiplicity of loudspeakers is installed within the closed passage 20 and connected to the broadcasting system 220 to announce predetermined emergency guide information or alarm signals in response to an audio control signal ACS issued by the system 220 upon an occurrence of the trouble. A telephone module 360 is also installed within the passage and coupled to the RS unit 210, wherein the module includes a multiplicity of hand telephone sets with order-wire functions, each telephone user being capable of communicating with each other, or with subscribers of a public switched telephone network (PSTN) through the RS unit 210. Duplex cables among the MS module, each RS unit, each broadcasting system and each AUX device and also a mode of loop of cable among the RS unit 210 and the AUX devices 310 to 340 are formed to improve the reliability of data to be communicated between them.

The system controller 120, the MS module 180 and the RS unit 210 are connected with the PSTN so that the emergency guide information issued by the controller in case of the trouble can be relayed to predetermined organizations such as a firehouse, government and public offices and related sections (not shown) prepared in the CATMS and telephone subscribers within the CATMS can communicate with other telephone subscribers of the PSTN. Once the CATMS_0 is issued by the CATMS's operator, the monitoring and control operation is always performed in the CATMS 500 until a predetermined stop instruction, e.g., EXIT, is given by the operator.

Details of the operation to manage equipment and workers within the closed passage in accordance with the present invention will be provided with reference to FIGS. 1 and 2A to 2L hereinafter.

Figure 2A:
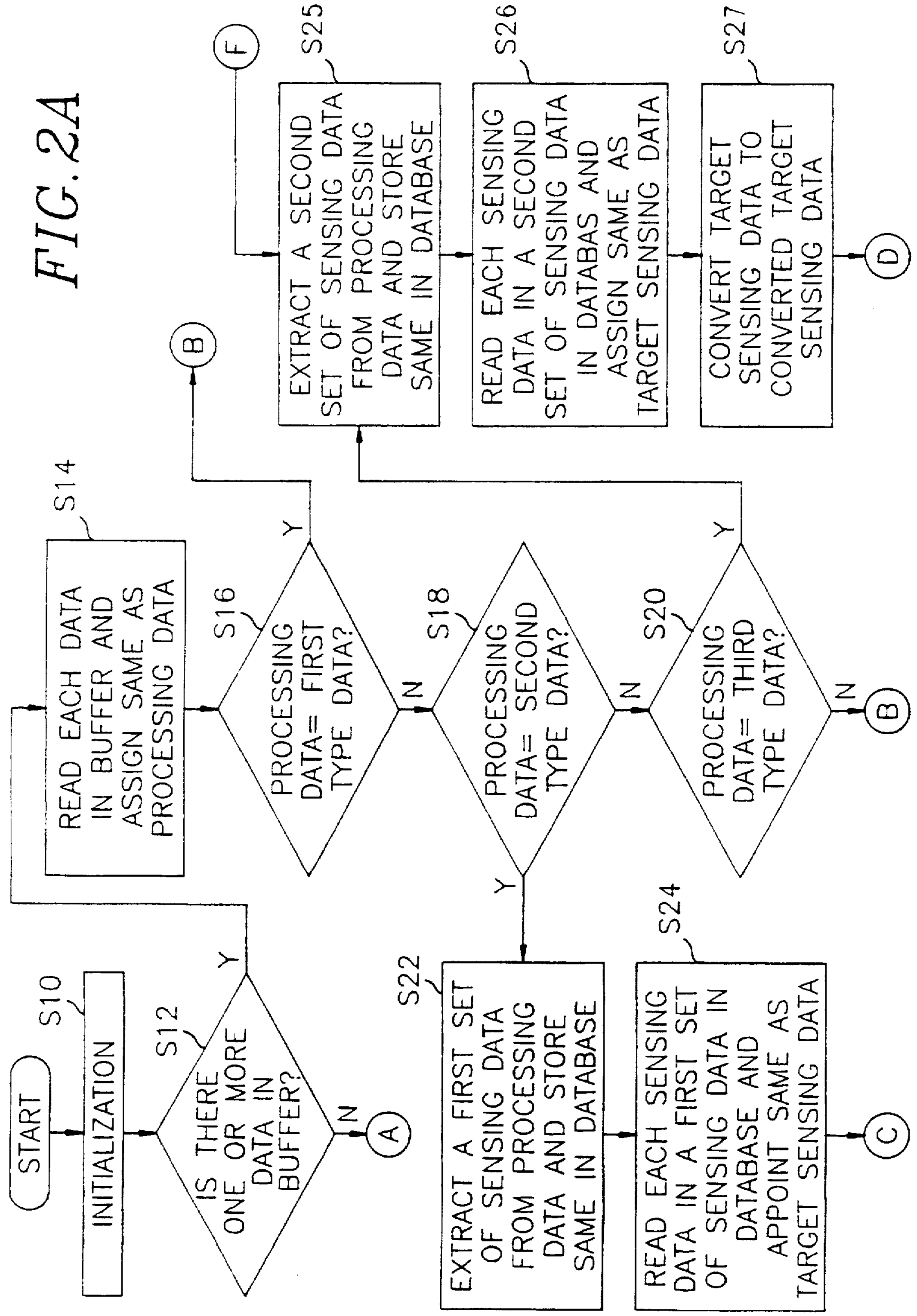
FIGS. 2A to 2L present flow charts illustrating the procedures for managing facilities and workers within a closed passage at the system controller shown in FIG. 1.

As shown in FIG. 2A, the inventive process is initiated at step S10 by issuing the predetermined start instruction, i.e., CATMS_O, as described early. When the start instruction is given, all the variables to be utilized for the management process in the CATMS are initialized. At a subsequent step S12, the system controller 120 checks whether or not there is one or more data in the buffer of the MSIO module, wherein each data is either formatted sensing data having sensing data transmitted through the AUX device 320, the RS unit 210 from the sensors 371 and 378, or data from/to the GUI unit which is other than the formatted sensing data.

Figure 2B:
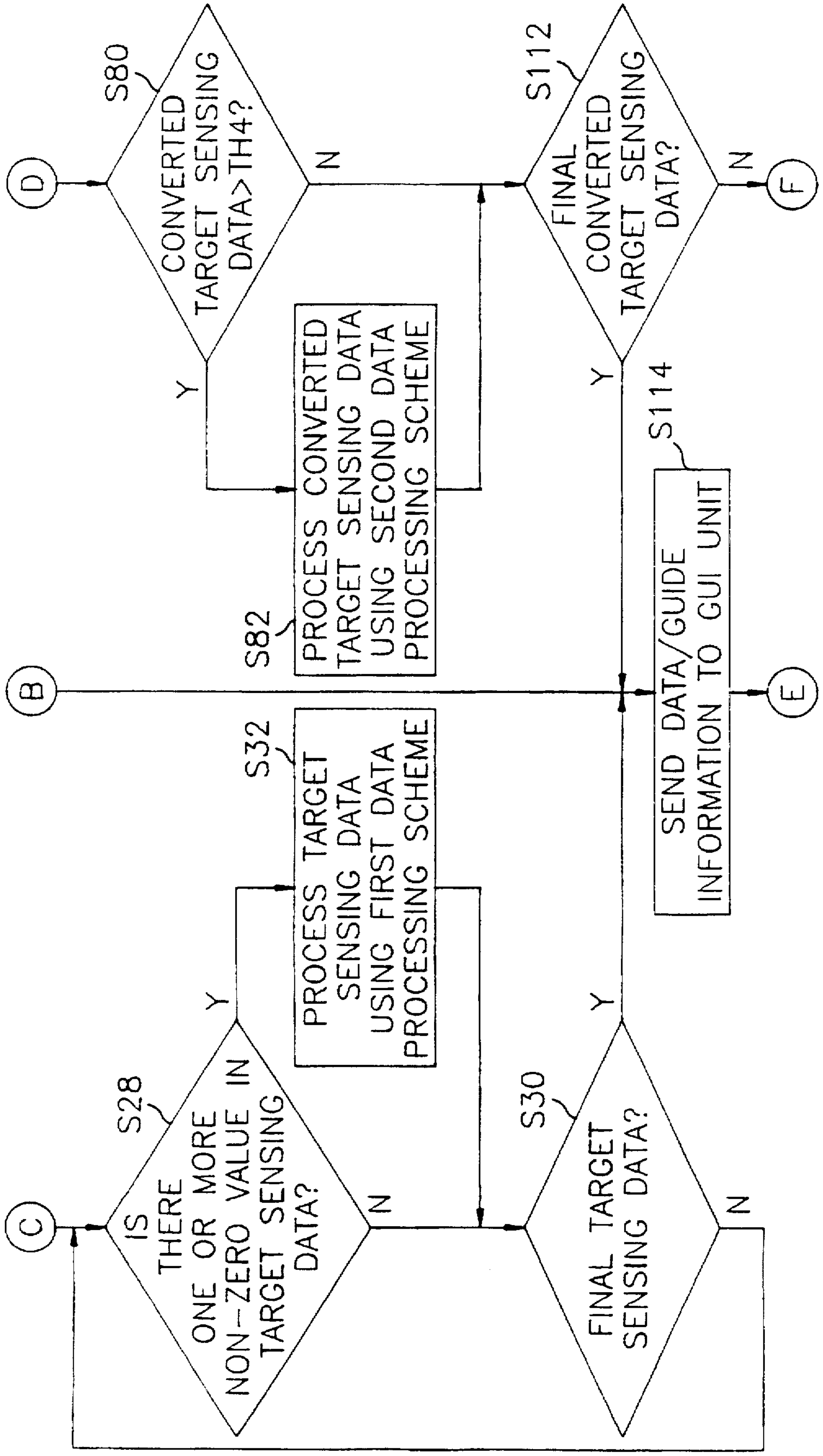
Figure 2C:
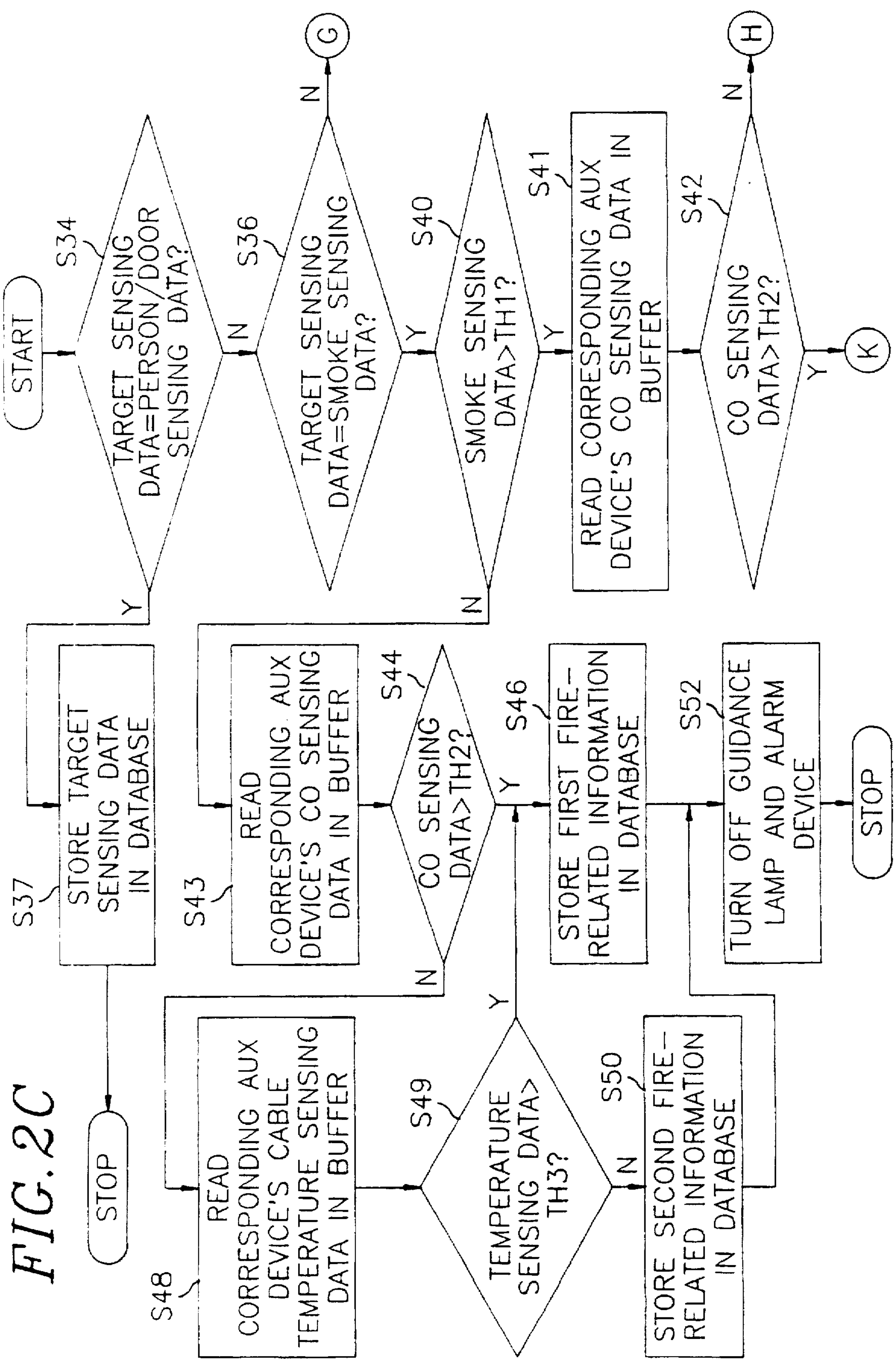
Figure 2D:
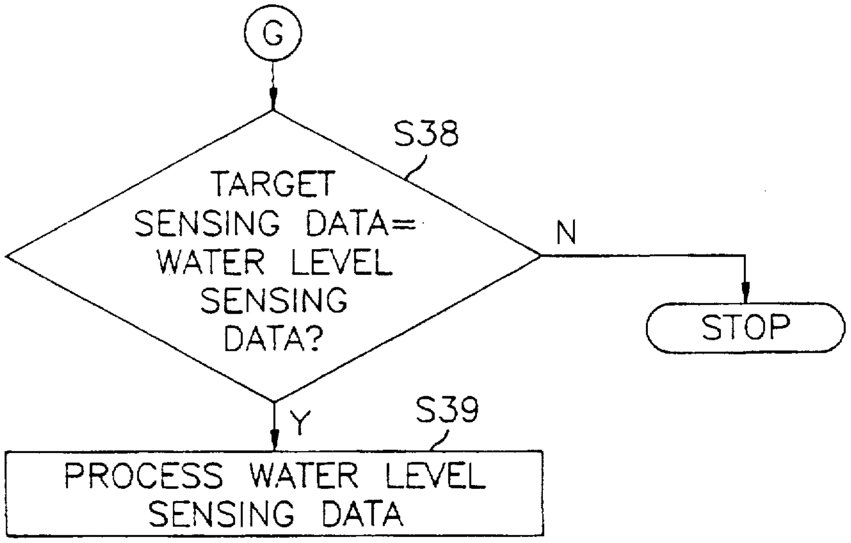
Figure 2E:
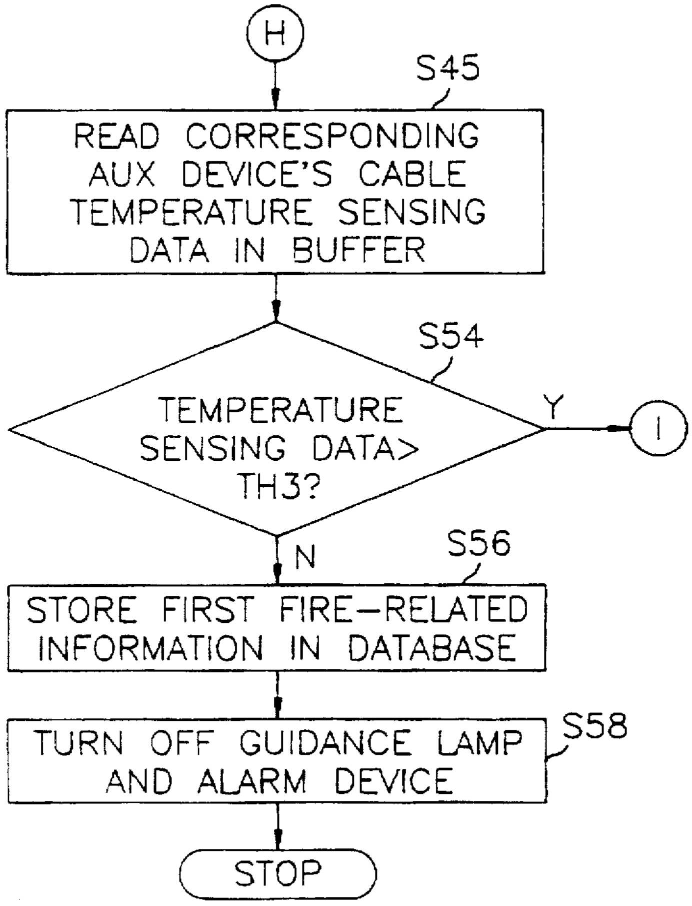
Figure 2F:
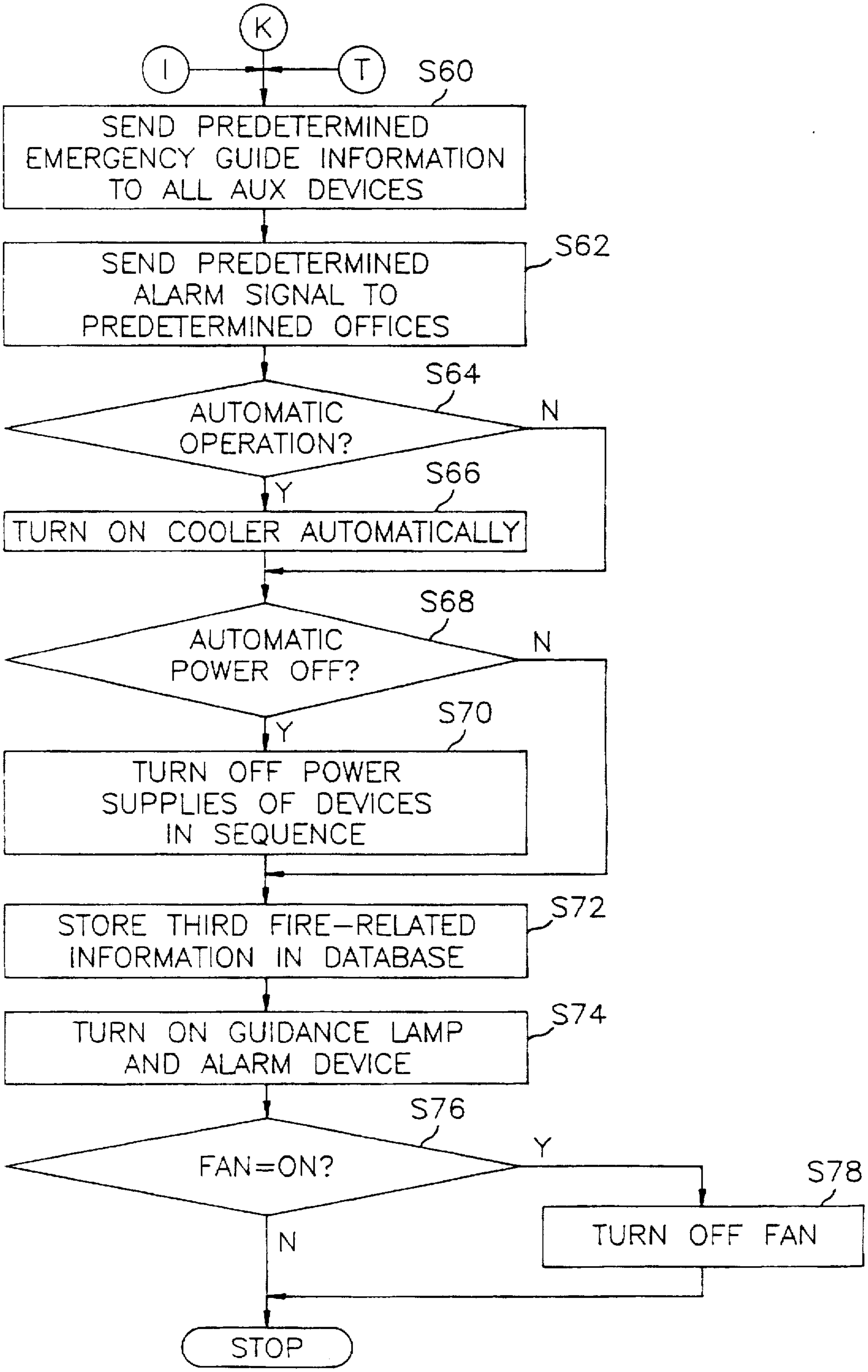
Figure 2G:
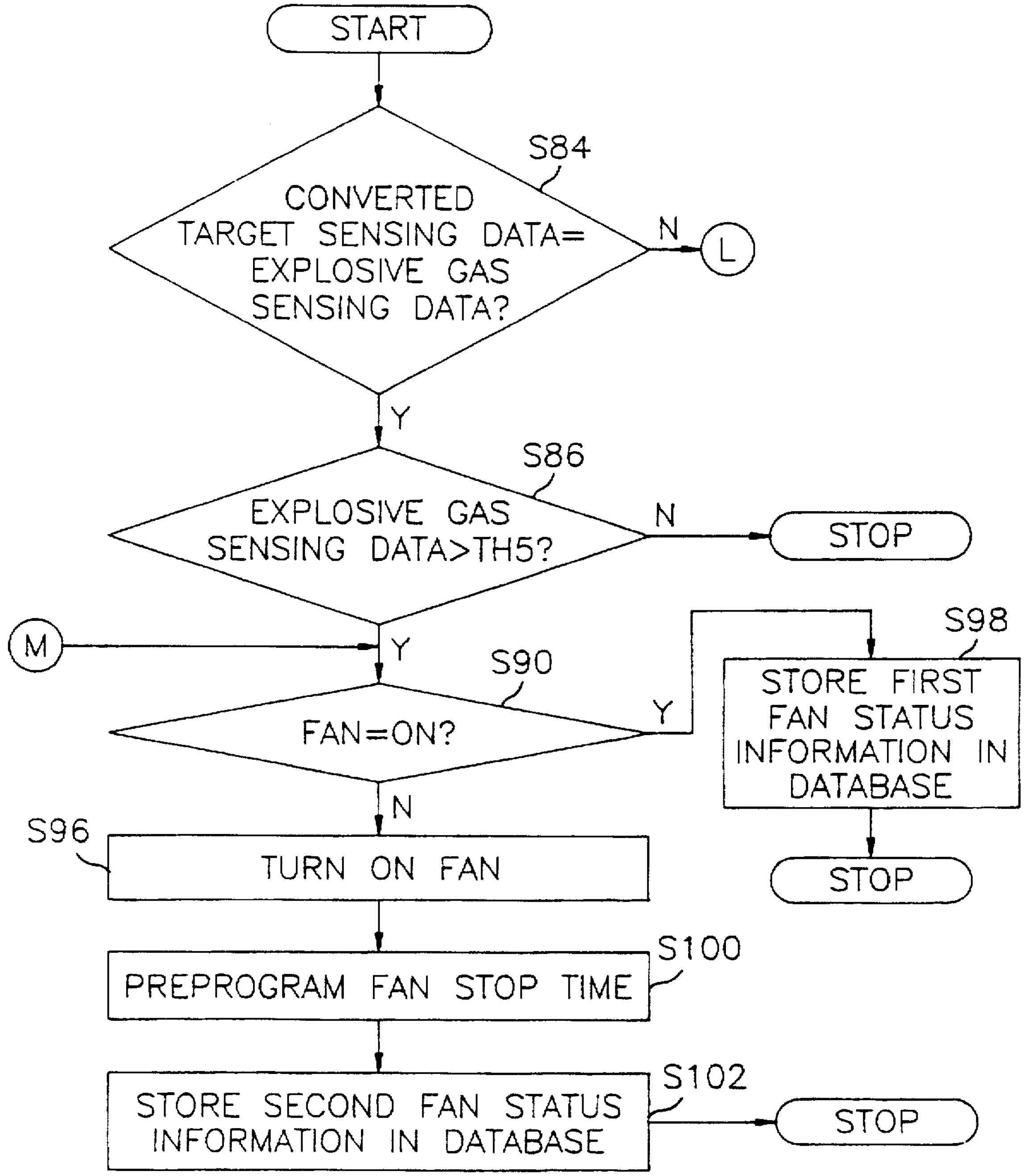
Figure 2H:
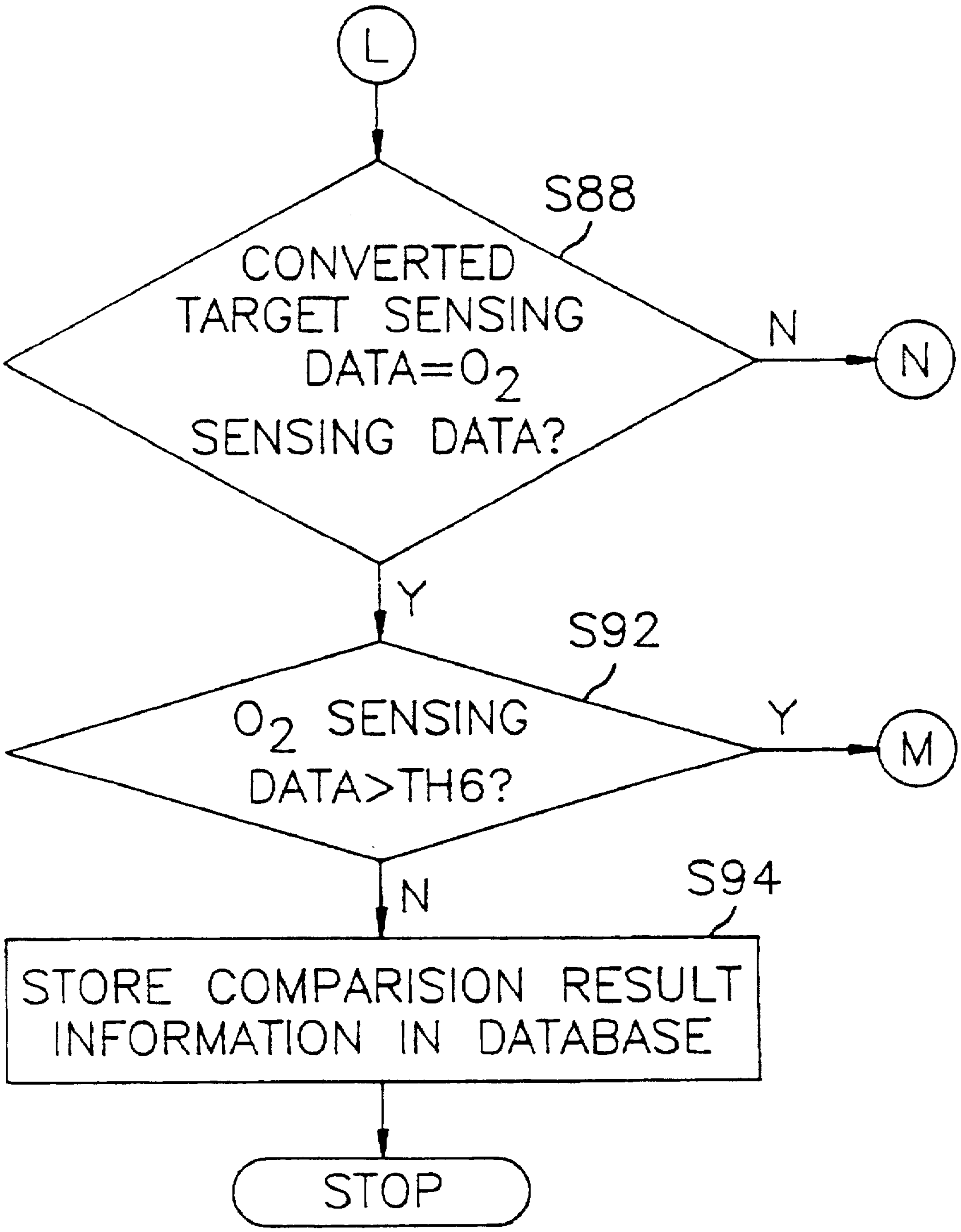
Figure 2I:
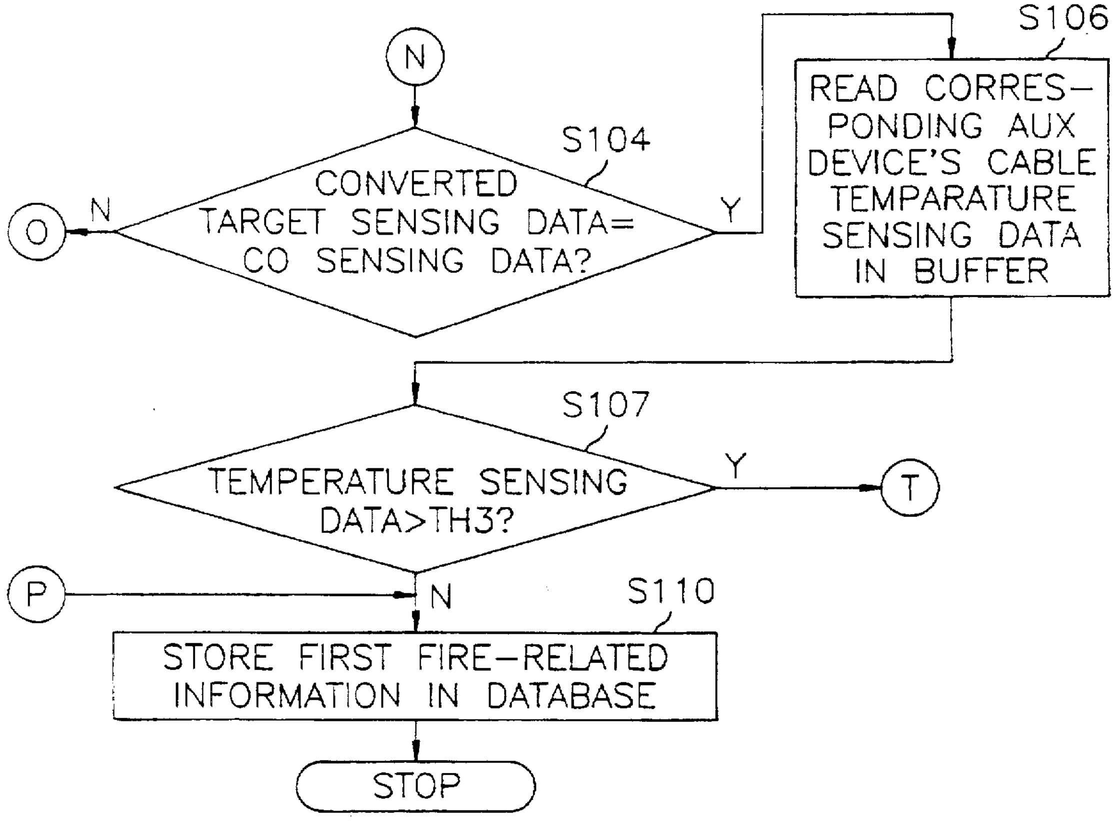
Figure 2J:
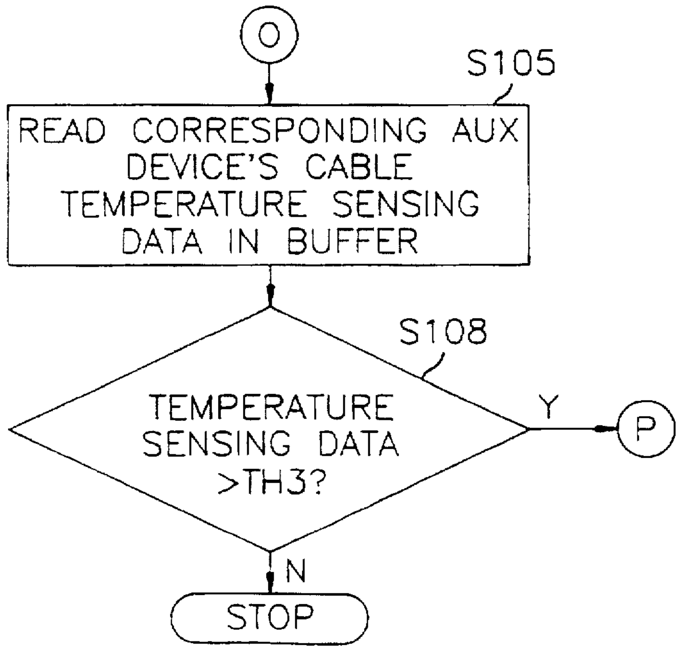
Figure 2K:
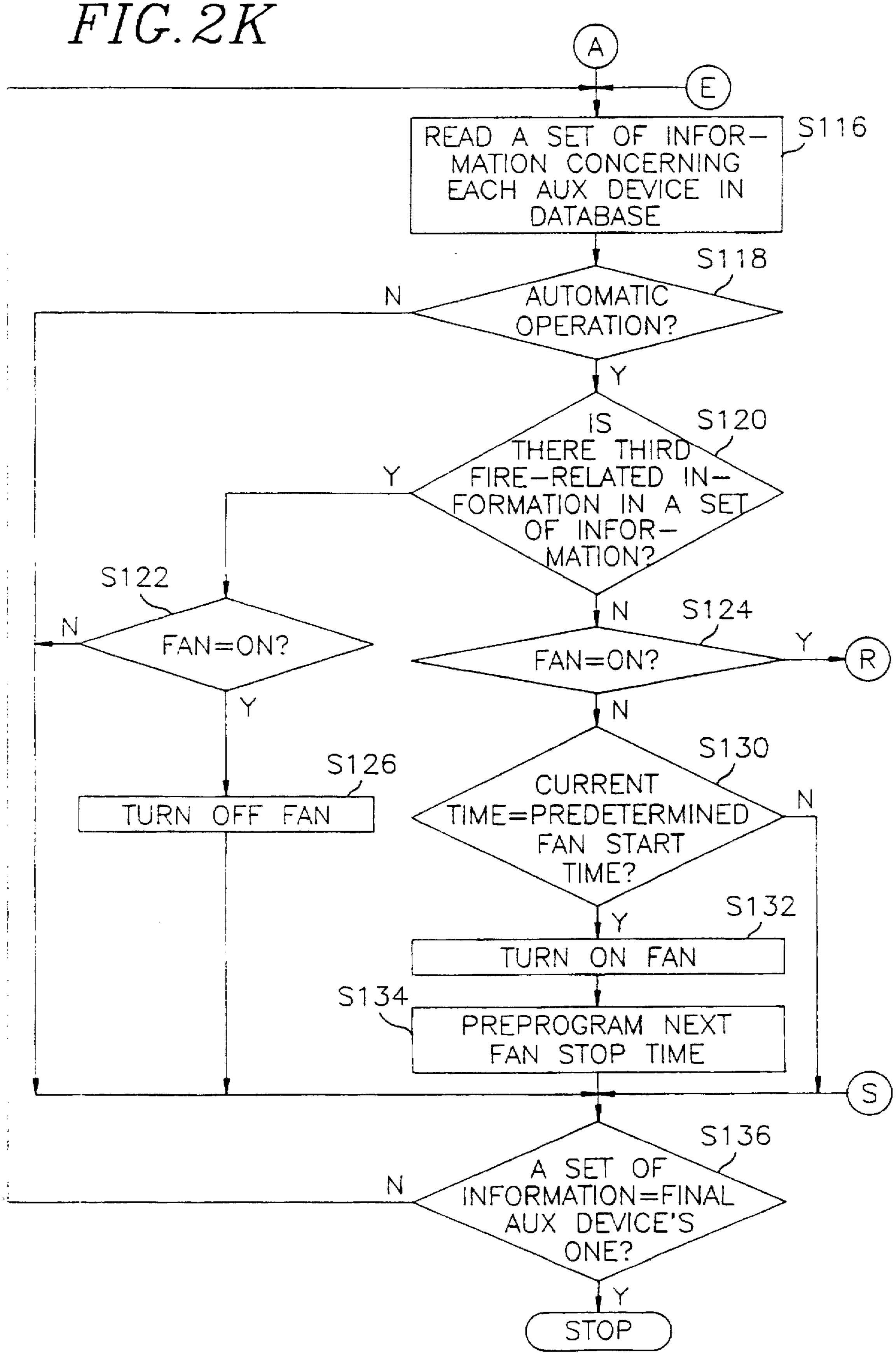

At step S12, if the check result is NO, the inventive process goes to step S116 as shown in FIG. 2K via a tap A to control the operation of the fan 391 among the components 391 to 394, as further explained later. However, if the check result is YES, the process goes to step S14 where the controller 120 sequentially reads each of the one or more data stored in the buffer and then assigns same as processing data.

In case the processing data is data provided through the RS unit 210 and the AUX device 320 from the sensors 371 to 378, it contains overhead information such as data representing the type thereof, address data of the AUX device 320 and data indicating the sequence of each of the sensors. In such a case, the processing data further contains a first or second set of sensing data obtained from the sensors 371 to 373 and 376, or 374, 375, 377 and 378, wherein each sensing data in the set is comprised of non-zero values of a predetermined bit length if there is a variation between its current and previous sensing values and only zero values if otherwise. On the other hand, in case the processing data is command or response data to/from the GUI unit, it contains only data and simple overhead information thereon.

After performing the reading and assigning at step S14, the process proceeds to step S16 where the controller 120 decides based on the overhead information in the processing data whether or not the processing data is a first type of data, e.g., data from/to the GUI unit which is one of higher processors in the center 100. If the decision result is YES, the process follows to step S114 as shown in FIG. 2B through a tap B; and, if otherwise, the process goes to step S18 where the controller 120 determines based on the overhead information whether or not the processing data is a second type of data, e.g., formatted sensing data having a first set of sensing data from the sensors 371 to 373 and 376 which sense a person, water level, fire and door, respectively,.

At step S18, if the check result is YES, the process goes to step S22 where the controller 120 extracts only the first set of sensing data from the processing data and stores same in the database of the storage device. At a next step S24, the controller 120 sequentially reads each sensing data in the first set of sensing data stored in the database to appoint same as target sensing data and then the process follows to step S28 as shown in FIG. 2B via a tap C.

On the other hand, if the check result at step S18 is NO, then at a next step S20, the controller 120 decides based on the overhead information whether or not the processing data is a third type of data, e.g., formatted sensing data having a second set of sensing data from the sensors 374, 378, 375 and 377 which sense gas and temperature and operation status of the pump 393 and the fan 391, respectively. If the decision result is NO, the process follows to step S114 as shown in FIG. 2B through the tap B; and, if otherwise, the process goes to step S25 where the controller 120 extracts only the second set of sensing data from the processing data and stores same in the database of the storage device. At a next step S26, the controller 120 sequentially reads each sensing data in the second set of sensing data stored in the database and assigns same as target sensing data.

Subsequently, at step S27, the controller 120 converts the target sensing data into converted target sensing data with a real value. In other words, the controller 120 converts the target sensing data of a hexadecimal digit to the converted target sensing data with one real value out of many prepared on a look-up table of the database in the storage device, which corresponds to the target sensing data. After converting the target sensing data into the converted target sensing data, the process proceeds to step S80 as shown in FIG. 2B via a tap D.

At step S28, being sent from step S24 through the tap C, the controller 120 tests, as shown in FIG. 2B, whether or not the target sensing data includes one or more non-zero values representing that there is a variation between its previous and current sensing values. If the test result is NO, the process follows to step S30; and, if otherwise, the process goes to step S32 where the controller 120 processes the target sensing data through the use of a first data processing scheme of the present invention which starts from step S34 as will be explained in detail with reference to FIGS. 2C to 2F below.

Specifically, at step S34 shown in FIG. 2C, the controller 120 checks whether or not the target sensing data is either one of person and door sensing data which have been measured by the sensors 371 and 376. If the check result is NO, i.e., if the target sensing data is not related to any of them, the process proceeds to step S36; and, if otherwise, the process goes to step S37 where the controller 120 stores the target sensing data in the database to be used as statistical data in the CATMS and then stops the process.

At step S36, on the other hand, the controller 120 tests whether or not the target sensing data is smoke sensing data obtained by the sensor 373. If the test result is NO, the process proceeds to step S38 as shown in FIG. 2D via a tap G, wherein the controller 120 checks if the target sensing data is water level sensing data from the sensor 372; and if otherwise, the process goes to step S40. At step S38, if the target sensing data is the water level sensing data, the process proceeds to step S39 where the controller 120 processes the target sensing data of the water level by employing one of conventional water level sensing data processing methods; and if otherwise, the process is stopped.

At step S40, on the other hand, the controller 120 compares the smoke sensing data with a first predetermined threshold value TH1 prestored in the database, wherein TH1 is a predetermined real number. In a preferred embodiment of the present invention, if the data is greater than TH1, the controller 120 decides that a fire is detected within the closed passage and then the process goes to step S41. However, at step S40, if the data is not greater than TH1, the controller 120 regards that there is no fire detected and then the procedure goes to step S43.

At step S41, the controller 120 reads carbon mono-oxide (CO) sensing data, sensed by the gas sensor 374 coupled to the AUX device 320, out of the one or more data stored in the buffer, wherein the CO sensing data represents a CO value within a predetermined region of the AUX device 320. At a subsequent step S42, the CO sensing data is compared with a second predetermined threshold value TH2 prestored in the database, TH2 being a predetermined real number. If the data is not greater than TH2, the process goes to step S45 as shown in FIG. 2E via a tap H; and, if otherwise, the process proceeds to step S60 as shown in FIG. 2F via a tap K.

On the other hand, at step S43, the controller 120 performs a same process as in said step S41, i.e., it reads the CO sensing data, sensed by the gas sensor 374 coupled to the AUX device 320, out of the one or more data stored in the buffer. At a next step S44, the controller 120 compares the read CO sensing data with the second threshold value TH2 in the database same as in step S42. At step S44, if the data is greater than TH2, the process goes to step S46; and, if otherwise, the process proceeds to step S48 where the controller 120 reads temperature sensing data, which has been measured by the temperature/humidity sensor 378, out of the one or more data in the buffer. The temperature sensing data is sensing data representing temperature of cables which are connected to the fan 391 and the pump 393.

At a next step S49, the temperature sensing data read at step S48 is compared with a third predetermined threshold value TH3 prestored in the database to check whether the data is greater than TH3 or not, wherein TH3 is a predetermined real number. If the check result is YES, the process follows to step S46; and, if otherwise, the process goes to step S50.

In a preferred embodiment of the invention, in case either the CO sensing data is greater than TH2 at step S44 or the temperature sensing data is greater than TH3 at step S49, even if the CO sensing data was not greater than TH2 at step S44, at the following step S46, the controller 120 stores first fire-related information, representing that there is a possibility of fire occurrence within the closed passage, in the database. On the other hand, in case both the CO sensing data is not greater than TH2 at step S44 and at the same time the temperature sensing data is not greater than TH3 at step S49, then at a following step S50, the controller 120 stores second fire-related information, meaning that no fire has been detected within the closed passage, in the database. After storing the fire related information at step S46 or step S50, the process follows to step S52 where the controller 120 turns off the operations of the guidance lamp 394 and the alarm device in the MS module 180 by issuing the fourth and a fifth component control signals, CCS4 and CCS5, to them, respectively, through the MS module 180, the RS unit 210 and the AUX device 320, and then the process is stopped.

Subsequently, at step S45 tapped from step S42 via the tap H, as shown in FIG. 2E, the controller 120 carries out a same operation as in said step S48, i.e., it reads the temperature sensing data measured by the temperature/humidity sensor 378 among the one or more data in the buffer. As noted above, the temperature sensing data represents the temperature of cables connected to the fan 391 and the pump 393. Next, at step S54, like as at step S49, the temperature sensing data is compared with the predetermined threshold value TH3 stored in the database to check if the data is greater than TH3. For instance, if the check result is YES, the process follows to step S60 as shown in FIG. 2F via a tap I; and, if otherwise, the process goes to step S56 where the first fire-related information having the same meaning as explained above is stored in the database. At a subsequent step S58, the fourth and the fifth component control signals CCS4 and CCS5 are issued to the guidance lamp 394 and the alarm device in the module 180, respectively, through the components connected therebetween, thereby turning off the operation of each of them, and then the process is stopped.

In a preferred embodiment of the invention, in case either the smoke sensing data is greater than TH1 at step S40 and at the same time the CO sensing data is greater than TH2 at step S42, or the smoke sensing data is greater than TH1 at step S40, the CO sensing data is not greater than TH2 at step S42 and the temperature sensing data is greater than TH3 at step S54, at a subsequent step S60, as shown in FIG. 2F, the controller 120 reads predetermined emergency guide information prestored in the database and sends same to all of the AUX devices 310 to 340 so that all the personnel in the closed passage can respond properly and then the procedure follows to step S62. At step S62, the controller 120 reads a predetermined alarm signal or warning sounds prestored in the database and automatically sends same to each of predetermined organizations such as related sections in the CATMS, firehouse, government and public offices through corresponding telephone lines.

At a subsequent step S64, the controller 120 checks if the CATMS's operator wishes to switch to an automatic control mode of the operation of the cooler 392 under the control of a preset timer. If the check result is NO, i.e., if the operator does not want to switch to the automatic control mode of the operation of the cooler 392, the process directly follows to step S68; and, if the check result is YES, the process goes to step S66 where the controller 120 issues the second component control signal CCS2 to the cooler 392 through the MS module 180, the RS unit 210 and the AUX device 320, thereby automatically turning on the operation thereof under the control of the preset timer, and then proceeds to step S68.

At step S68, the controller 120 checks if the CATMS's operator wants to switch to an automatic turn-off mode of the operations of power supplies of the fan 391 and the pump 393, general fluorescence lamps (not shown) within the closed passage and the cooler 392. If the check result is NO, the process directly goes to step S72; and, if the check result is YES, the process goes to step S70 where the controller 120 sequentially issues four component control signals, CCS1, CCS3, CCS6 and CCS2, to the corresponding devices, respectively, thereby turning off the operation of each of them under the control of the preset timer. At a subsequent step S72, the controller 120 stores third fire-related information, indicating that a fire is detected within the closed passage, in the database and then the process goes to step S74.

At step S74, in order to turn on the operation of each of the guidance lamp 394 and the alarm device in the MS module 180, the controller 120 issues the two component control signals, CCS4 and CCS5, to them, respectively; and then the process proceeds to step S76. At step S76, the controller 120 checks if the fan 391 is ON. If it is checked that the fan 391 is being operated, the procedure goes to step S78 where the controller 120 immediately turns off the operation of the fan 391 by providing the first component control signal CCS1 thereto and then the process is stopped, and, if otherwise, i.e., if it is checked that the fan is OFF, then the process is stopped.

Referring back to FIG. 2B, at step S30, the controller 120 checks if the target sensing data which has been tested at step S28 or processed at step S32 is final sensing data of the sensing data contained in the first set. If the check result is NO, the process returns to the testing step S28 until all of the sensing data included in the first set is processed; and, if otherwise, the process goes to step S114.

On the other hand, at step S80 tapped from step S27 via the tap D, the controller 120 tests whether or not the converted target sensing data, which has derived at step S26 shown in FIG. 2A, is greater than a fourth predetermined threshold value TH4, TH4 being a predetermined real number. If it is checked YES, the process goes to S82 where steps S84 to S110 shown in FIGS. 2G and 2J are carried out by employing a second data processing scheme in accordance with the invention which will be fully described below; and, if otherwise, the process follows to step S112.

Turning now to FIG. 2G, it is checked at step S84 if the converted target sensing data is sensing data regarding an explosive gas, e.g., Methane ($CH_4$), provided from the gas sensor 374 capable of sensing various gases through the AUX device 320, the RS unit 210 and the MS module 180. If it is checked YES, the explosive gas sensing data is compared at step S86 with a fifth predetermined threshold value TH5 stored in the database, TH5 being a predetermined real number; and, if otherwise, the process goes to step S88 shown in FIG. 2H via a tap L.

At step S86, if the explosive gas sensing data is determined to be larger than TH5, the controller 120 checks at step S90 if the fan 391 is ON or OFF; and, if otherwise, the process is stopped. On the other hand, at step S88, following step S84 via the tap L, as shown in FIG. 2H, the controller 120 checks if the converted target sensing data is oxygen ($O_2$) sensing data provided from the gas sensor 374 through the AUX device 320, the RS unit 210 and the MS module 180. If the check result is NO, the process follows to step S104 as shown in FIG. 2I via a tap N; and, if otherwise, the process goes to step S92, wherein the converted target sensing data, i.e., $O_2$ sensing data, is compared with a sixth predetermined threshold value TH6 stored in the database, TH6 being a predetermined real number. At step S92, if the $O_2$ sensing data is greater than TH6, the process goes to step S90 via a tap M as shown in FIG. 2G; and, if otherwise, at a following step S94, the information representing the comparison result from said step S92 is stored in the database and then the procedure stops.

At step S90 as shown in FIG. 2G, on the other hand, if the fan 391 is ON, then at step S98, first fan status information indicating that the fan is operating is stored in the database and then the process stops; and if otherwise, i.e., if the fan is OFF, then at step S96, the fan 391 is turned on by issuing the first component control signal CCS1 to the fan 391.

At a following step S100, the CATMS's operator preprograms to preset a time at which the fan 391 will be automatically stopped, wherein the preprogramming may be accomplished by simply setting the timer thereof. Next, at step S102, the controller 120 stores second fan status information, representing that the fan has started to operate, in the database and then the process is stopped.

At step S104 shown in FIG. 2I, tapped via the tap N at step S88 when the converted target sensing data is not the $O_2$ sensing data as shown in FIG. 2H, the controller 120 tests whether or not the converted target sensing data is carbon mono-oxygen (CO) sensing data from the gas sensor 374 provided through the AUX device 320, the RS unit 210 and the MS module 180. If it is not the CO sensing data, it is tapped to step S105 shown in FIG. 2J via a tap 0; and, if the data is CO sensing data, then at step S106, the temperature sensing data, measured by the temperature/humidity sensor 378, is read from the one or more data in the buffer, wherein the temperature sensing data has the same meaning as described above. At a subsequent step S107, the temperature sensing data is compared with the third threshold value TH3 stored in the database. If the temperature sensing data is greater than TH3, the process returns to step S60 shown in FIG. 2F via a tap T to execute said steps S60 to S78 as set forth above; and, if otherwise, the process follows to step S110.

On the other hand, at step S105 shown in FIG. 2J, tapped from step S104, the temperature sensing data on the cables in the buffer is read and thereafter, at step S108, the data is compared with TH3. At step S108, if the temperature sensing data is greater than TH3, the process goes to step S110 and, if otherwise, the process is stopped. At step S110, the controller 120 stores the first fire-related information having the same meaning as explained above in the database and stops the process.

As can be seen from the above, in case the converted target sensing data is the CO sensing data at step S104 and at the same time the temperature sensing data is larger than TH3 at step S107, the process returns to step S60 shown FIG. 2F to execute said steps S60 to S78, as fully explained early. On the other hand, in case either the converted target sensing data is the CO sensing data and the temperature sensing data is not larger than TH3, or the converted target sensing data is not the CO sensing data and the temperature sensing data is larger than TH3, the process goes to step S110 for the controller 120 to store the first fire-related information in the database.

Referring back to FIG. 2B, at step S112, if it is found that the converted target sensing data, tested at step S80 or processed at step S82, is not the last one in the second set, then the process returns to said step S25 shown FIG. 2A through a tap F to repeat said steps S25 to S27 and S80 to S112 as set forth above until all of the sensing data included in the second set is processed; and, if otherwise, the process goes to step S114.

As shown in FIG. 2B, whether the converted target sensing data is found at step S30 to be the final one in the first set, or the processing data is found at step S16 to be the first type of sensing data, or the converted target sensing data is found at step S112 to be the final one in the second set, at step S114, the controller 120 provides the GUI unit with the data responding to the command data stored in the buffer, or guide information representing that all the sensing data in the first or the second set has been processed and then the process goes to step S116 shown in FIG. 2K via a tap E.

Referring now to FIG. 2K, there is illustrated a novel method for effectively controlling the operation of the fan 391. Specifically, at step S116, the controller 120 first reads a set of information related to the AUX device 320 in the database. The set of information includes all the information checked and tested with respect to the AUX device 320 and predetermined information such as a fan start time, a fan stop time, a fan running time interval and a fan stopping time interval. At a subsequent step S118, the controller 120 checks whether or not the CATMS's operator wishes to switch to the automatic control mode of the operation of the fan 391 under the control of the preset timer. If the check result is NO, the process jumps to step S136; and, if otherwise, the process goes to step S120 wherein the controller 120 checks whether or not, in the set of information, there is the third fire-related information indicating that a fire is detected in the closed passage. At step S120, if it is checked Yes, the process goes to step S122 where the controller 120 checks if the fan 391 is ON; and, if otherwise, the process follows to step S124.

If the fan 391 is ON at step S122, at a following step S126, the controller 120 issues the first component control signal CCS1 to the fan 391 through the MS module 180, the RS unit 210 and the AUX device 320, thereby turning off the operation of the fan 391; and, however, if the fan 391 is found to be OFF at step S122, the process directly jumps to step S136. On the other hand, if the fan 391 is found to be ON at step S124 instead of S122, then the process goes to step S128 shown in FIG. 2L via a tap R; and, if otherwise, the process proceeds to step S130 where the controller 120 checks whether the current time on the timer is reached the predetermined fan start time stored in the database. At step S130, if the current time has been reached the fan start time, then the process goes to step S132 where the controller 120 provides the first component control signal CCS1 to the fan 391 through the MS module 180, the RS unit 210 and the AUX device 320, thereby turning on the operation of the fan 391. Thereafter, at step S134, the controller 120 preprograms a next fan stop time which will be obtained by adding the predetermined fan running time interval to the current time and then the process follows step S136. However, at step S130, if the current time has been not reached the fan start time yet, then the process directly jumps to step S136.

Figure 2L:
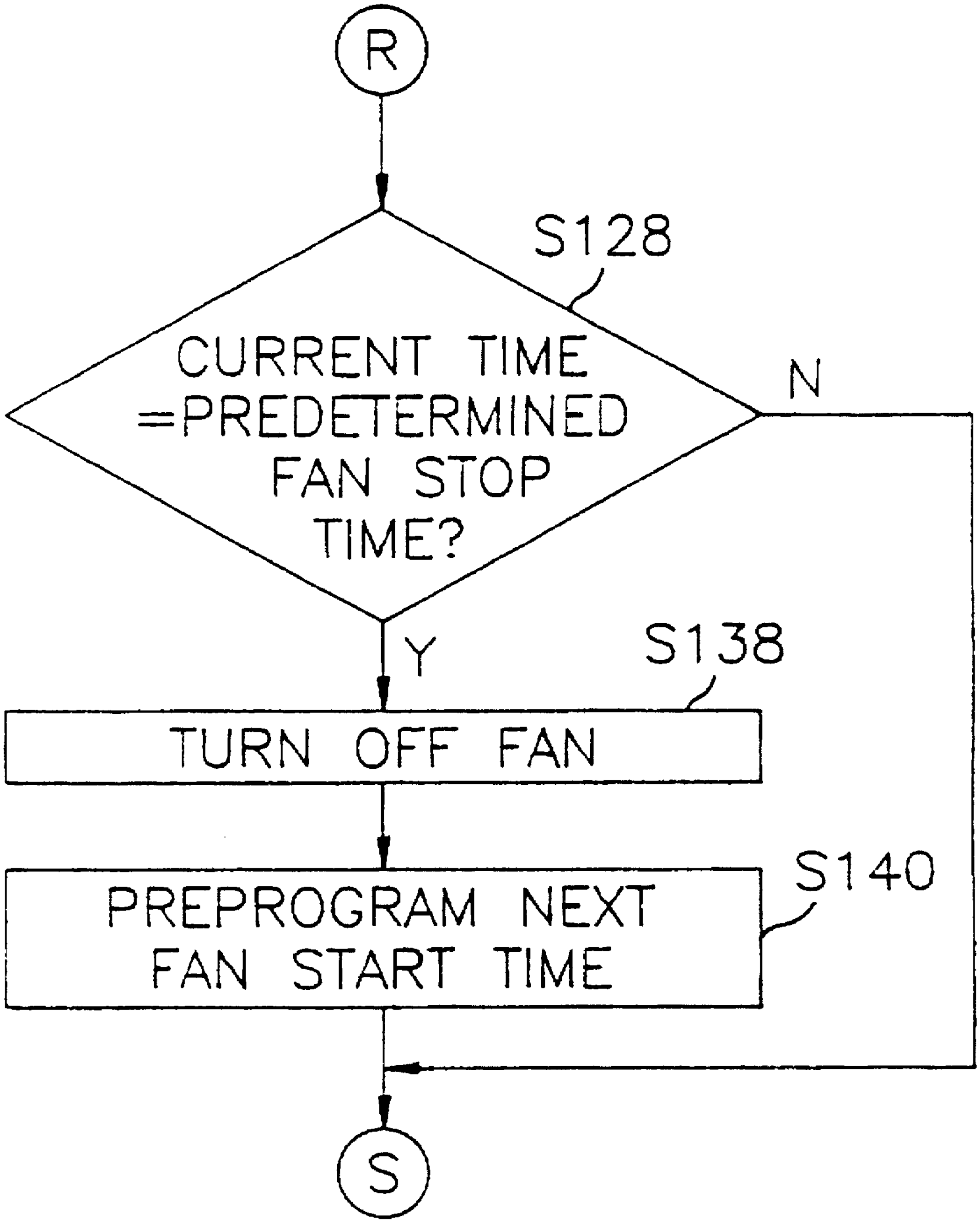

At step S128 shown in FIG. 2L, tapped from step S124 shown in FIG. 2K, the controller 120 first checks whether the current time is reached the predetermined fan stop time. If the current time has reached the fan stop time, then the process goes to step S138 where the controller 120 issues the first component control signal CCS1 to the fan 391 through the MS module 180, the RS unit 210 and the AUX device 320, thereby turning off the operation of the fan 391. At a subsequent step S140, the controller 120 preprograms a next fan start time which will be derived by adding the fan stopping time interval to the current time and then the process follows to step S136. However, at step S128, if the current time has not reached the fan stop time yet, then the process jumps to step S136 shown in FIG. 2K through a tap S.

Referring back to FIG. 2K, at step S136, the controller 120 checks whether or not the set of information processed at steps S116 to S140 is information related to the final AUX device of the set of AUX devices. If it is checked to be NO, the process returns to step S116 to repeat the processes performed at steps S116 to S140 until sets of information regarding all the AUX devices have been processed; and, if otherwise, the whole process is stopped. As a result, the present invention is capable of effectively protecting facilities and personnel within a closed passage from disaster by automatically sending emergency guide information to each of predetermined agencies and controlling the operation of each of components in the passage in case of a trouble such as a fire, harmful gas leakage, water intrusion, or the like.

While the present invention has been shown and described with respect to the particular embodiment, it will be apparent to those skilled in the art that many changes and modifications may be made without departing from the spirit and scope of the invention as defined in the appended claims.

What is claimed is:

1. A method for controlling an underground passage comprising the steps of:

(a) providing a central control comprising a system controller, at least one display unit, and a telephone connection to a publicly switch telephone network (PSTN);

(b) providing at least one remote station connected to said central control by a first data link, said at least one remote station being identified by a first address on said first data link;

(c) providing a plurality of auxiliary devices in the underground passage, said plurality of auxiliary devices and said remote station being connected to one another by a second data link, each of said auxiliary devices being identified by a unique second address on said second data link, and being connected to a plurality of sensors and also to at least one selectively operable component, said sensors and said at least one component all being provided in the underground passage;

(d) receiving, at a first auxiliary device, sensing data from said plurality of sensors connected to said first auxiliary device;

(e) combining, at said first auxiliary device, said sensing data with the unique second address identifying said first auxiliary device, to thereby produce formatted sensing data;

(f) transmitting said formatted sensing data via said second data link to said remote station;

(g) combining, at said remote station, said formatted sensing data with the first address identifying said remote station, to thereby produce newly formatted sensing data;

(h) transmitting said newly formatted sensing data via said first data link to said central control;

(i) determining, at said system controller of said central control, whether or not a trouble condition exists within the passage, based on said newly formatted sensing data; and (j) if it is determined that a trouble condition exists, automatically sending without operator intervention, from said central control:

(j1) emergency information to at least one predetermined agency via said PSTN;

(j2) a warning signal to the underground passage; and (j3) at least one component control signal to said first auxiliary device in the underground passage via said first and second data links, to thereby control the operation of said at least one component, wherein said at least one component includes a fan connected to said first auxiliary device.

2. The method of claim 1, comprising the additional step of disconnecting power to said at least one component, upon detection of a trouble condition.

3. The method of claim 1, wherein the trouble condition is the presence in the underground passage of either:

(i1) an explosive gas in a concentration exceeding a first predetermined threshold; or (i1) oxygen in a concentration exceeding a second predetermined threshold, and said at least one component control signal turns on the fan, if the fan is off.

4. The method of claim 1, wherein the trouble condition includes a temperature of a cable connecting said plurality of auxiliary devices exceeding a predetermined threshold, and said at least one component control signal turns off the fan, if the fan is on.

5. The method of claim 1, wherein the trouble condition is the simultaneous presence in the underground passage of both:

(i1) smoke in a concentration exceeding a first predetermined threshold; and (i2) either (i21) carbon monoxide in a concentration exceeding a second predetermined threshold, or (i22) a temperature of a cable connecting said plurality of auxiliary devices exceeding a third predetermined threshold, and said at least one component control signal turns off the fan, if the fan is on.

6. The method of claim 1, wherein the remote station and the central control are above-ground.

7. The method of claim 1, wherein the formatted sensing data is transmitted from said first auxiliary device through at least one neighboring auxiliary device, before reaching said remote station.

8. The method of claim 7, wherein the formatted sensing data is transmitted at a first predetermined transfer rate and the newly formatted sensing data is transmitted at a second predetermined transfer rate higher than said first predetermined transfer rate.

9. The method of claim 7, wherein said at least one component control signal passes through at least one neighboring auxiliary device, before reaching said first auxiliary device.

10. The method of claim 1, wherein each of the first and the second data links is constructed by a duplex cable.

11. The method of claim 1, wherein a telephone module is installed within the underground passage and connected to the remote station, the module including a plurality of hand telephone sets, wherein each telephone set has an order-wire function which enables the telephone users to communicate with each other and with subscribers of the PSTN.

* * * * *